(12) United States Patent
Krammer et al.

(10) Patent No.: US 10,385,932 B2
(45) Date of Patent: Aug. 20, 2019

(54) VISCOUS CLUTCH AND ASSOCIATED FLUX CIRCUIT CONFIGURATION

(71) Applicant: Horton, Inc., Roseville, MN (US)

(72) Inventors: Raimund Krammer, Gerolzhofen (DE); Derek Savela, St. Paul, MN (US); Bastian Brand, Schonungen (DE)

(73) Assignee: Horton, Inc., Roseville, MN (US)

( * ) Notice: Subject to any disclaimer, the term of this patent is extended or adjusted under 35 U.S.C. 154(b) by 115 days.

(21) Appl. No.: 15/591,576

(22) Filed: May 10, 2017

(65) Prior Publication Data

US 2017/0241490 A1    Aug. 24, 2017

Related U.S. Application Data

(63) Continuation of application No. 14/775,002, filed as application No. PCT/US2014/023260 on Mar. 11, 2014, now Pat. No. 9,709,103.

(Continued)

(51) Int. Cl.
*F16D 35/02* (2006.01)
*F16D 35/00* (2006.01)
*F16D 121/20* (2012.01)

(52) U.S. Cl.
CPC .......... *F16D 35/024* (2013.01); *F16D 35/02* (2013.01); *F16D 35/021* (2013.01); *F16D 35/00* (2013.01); *F16D 2121/20* (2013.01)

(58) Field of Classification Search
CPC ..................... F16D 35/00; F16D 35/02; F16D 35/021–026; F16D 2121/20
See application file for complete search history.

(56) References Cited

U.S. PATENT DOCUMENTS 923,565 A    6/1909   Newcomb
2,629,472 A  2/1953   Sterner
(Continued)

FOREIGN PATENT DOCUMENTS

CN    201190592 Y    2/2009
CN    101400916 A    4/2009
(Continued)

OTHER PUBLICATIONS

Notice of Reasons for Refusal issued in corresponding Japanese patent application No. 2016-501183, dated Nov. 29, 2017.
(Continued)

*Primary Examiner* — Stacey A Fluhart
(74) *Attorney, Agent, or Firm* — Westman, Champlin & Koehler, P.A.

(57) ABSTRACT

A viscous clutch includes a shaft, a rotor attached to the shaft, a housing located adjacent to the rotor, a working chamber defined between the rotor and the housing, a reservoir used to store a shear fluid, a valve assembly, an electromagnetic coil, and a flux insert in the housing. Selective introduction of the shear fluid to the working chamber facilitates selective torque transmission between the rotor and the housing. The valve assembly regulates flow of the shear fluid between the reservoir and the working chamber, and includes an armature. Selective energization of the electromagnetic coil governs actuation of the valve assembly. A flux circuit is provided that extends from the electromagnetic coil to the armature and back to the electromagnetic coil. The flux circuit passes through the flux insert and through the shaft, and the flux circuit crosses a radial air gap between the flux insert and the armature.

18 Claims, 10 Drawing Sheets

Related U.S. Application Data

(60) Provisional application No. 61/782,440, filed on Mar. 14, 2013.

(56) References Cited

U.S. PATENT DOCUMENTS

| | | | |
|---|---|---|---|
| 2,902,127 A | 9/1959 | Hardy | |
| 3,101,825 A | 8/1963 | Caroli et al. | |
| 3,215,235 A | 11/1965 | Kamm | |
| 3,319,754 A | 5/1967 | Kokochak et al. | |
| 3,380,565 A | 4/1968 | Wilkinson | |
| 3,404,832 A | 10/1968 | Sutaruk | |
| 3,648,811 A | 3/1972 | LaFlame | |
| 3,893,555 A | 7/1975 | Elmer | |
| 3,949,849 A | 4/1976 | Hammer | |
| 4,046,239 A | 9/1977 | Tinholt | |
| 4,246,995 A | 1/1981 | Gee | |
| 4,271,945 A | 6/1981 | Budinski | |
| 4,281,750 A | 8/1981 | Clancey | |
| 4,305,491 A | 12/1981 | Rohrer | |
| 4,355,709 A | 10/1982 | Light | |
| 4,362,226 A | 12/1982 | Gee | |
| 4,405,039 A | 9/1983 | Hauser | |
| 4,526,257 A | 7/1985 | Mueller | |
| 4,556,138 A | 12/1985 | Martin et al. | |
| 4,568,671 A | 2/1986 | D'Silva | |
| 4,579,206 A | 4/1986 | Velderman et al. | |
| 4,676,355 A | 6/1987 | Brunken et al. | |
| 4,727,969 A | 3/1988 | Hayashi et al. | |
| 4,779,323 A | 10/1988 | Bloemendaal | |
| 4,880,095 A | 11/1989 | Nakamura | |
| 4,893,703 A | 1/1990 | Kennedy et al. | |
| 4,987,986 A | 1/1991 | Kennedy et al. | |
| 5,099,803 A | 3/1992 | Nakamura | |
| 5,152,383 A | 10/1992 | Boyer et al. | |
| 5,226,517 A | 7/1993 | Grochowski | |
| 5,499,706 A | 3/1996 | Kawada | |
| 5,511,643 A | 4/1996 | Brown | |
| 5,722,523 A | 3/1998 | Martin | |
| 5,803,221 A | 9/1998 | Kawada et al. | |
| 5,893,442 A | 4/1999 | Light | |
| 5,896,964 A | 4/1999 | Johnston et al. | |
| 5,937,983 A | 8/1999 | Martin et al. | |
| 5,992,594 A | 11/1999 | Herrle et al. | |
| 6,026,943 A | 2/2000 | Fuchs et al. | |
| 6,032,775 A | 3/2000 | Martin | |
| 6,173,492 B1 | 1/2001 | Moser | |
| 6,419,064 B1 | 7/2002 | Krammer | |
| 6,443,283 B1 | 9/2002 | Augenstein et al. | |
| 6,530,462 B2 | 3/2003 | Lutz | |
| 6,550,596 B2 | 4/2003 | Shiozaki et al. | |
| 6,695,113 B2 | 2/2004 | Lutz | |
| 6,725,812 B1 | 4/2004 | Scott | |
| 6,752,251 B2 | 6/2004 | May et al. | |
| 6,935,478 B2 | 8/2005 | Drager et al. | |
| 7,044,282 B2 | 5/2006 | Saunders, III | |
| 7,047,911 B2 | 5/2006 | Robb et al. | |
| 7,083,032 B2 | 8/2006 | Boyer | |
| 7,178,656 B2 | 2/2007 | Pickelman et al. | |
| 7,191,883 B2 | 3/2007 | Angermaier | |
| 7,455,158 B2 | 11/2008 | Miura et al. | |
| 7,628,262 B2 | 12/2009 | Barnum et al. | |
| 7,828,529 B2 | 11/2010 | Baumgartner et al. | |
| 7,854,307 B2 | 12/2010 | Hennessy et al. | |
| 7,886,886 B2 | 2/2011 | Schultheiss et al. | |
| 7,938,240 B2 | 5/2011 | Hennessy et al. | |
| 7,946,400 B2 | 5/2011 | Hennessy et al. | |
| 7,954,616 B2 | 6/2011 | Buchholz | |
| 8,100,241 B2 | 1/2012 | Hennessy et al. | |
| 8,186,494 B2 | 5/2012 | Boyer | |
| 8,887,888 B2 | 11/2014 | Hennessy et al. | |
| 2002/0014804 A1 | 2/2002 | Nelson et al. | |
| 2002/0166747 A1* | 11/2002 | Lutz | F16D 35/02 192/58.61 |
| 2004/0084273 A1 | 5/2004 | May et al. | |
| 2004/0124057 A1 | 6/2004 | Shiozaki et al. | |
| 2004/0168877 A1 | 9/2004 | Drager et al. | |
| 2004/0242335 A1 | 12/2004 | Yamauchi | |
| 2005/0045443 A1 | 3/2005 | Tilly | |
| 2005/0189194 A1 | 9/2005 | Lindauer et al. | |
| 2005/0196297 A1 | 9/2005 | Baumgartner et al. | |
| 2006/0042902 A1 | 3/2006 | Boyer | |
| 2006/0237277 A1 | 10/2006 | Bohan | |
| 2006/0243553 A1* | 11/2006 | Light | F16D 35/024 192/58.7 |
| 2008/0023290 A1 | 1/2008 | Boyer | |
| 2009/0084650 A1 | 4/2009 | Hennessy et al. | |
| 2009/0101463 A1 | 4/2009 | Hennessy et al. | |
| 2009/0160589 A1 | 6/2009 | Krafft | |
| 2010/0059325 A1* | 3/2010 | Boyer | F16D 35/024 192/58.61 |
| 2011/0067970 A1 | 3/2011 | Harter et al. | |
| 2012/0138409 A1 | 6/2012 | Buchholz et al. | |
| 2012/0261014 A1 | 10/2012 | Rothoff et al. | |
| 2012/0279820 A1 | 11/2012 | Hennessy et al. | |
| 2013/0037371 A1 | 2/2013 | Yamada et al. | |
| 2016/0003310 A1 | 1/2016 | Savela | |

FOREIGN PATENT DOCUMENTS

| | | |
|---|---|---|
| DE | 3148872 A1 | 6/1983 |
| DE | 3243967 A1 | 5/1984 |
| DE | 3823871 A1 | 1/1990 |
| DE | 3941834 A1 | 6/1991 |
| DE | 4011528 A1 | 10/1991 |
| DE | 1984343 A1 | 3/2000 |
| DE | 19940099 A1 | 3/2001 |
| DE | 10219872 A1 | 11/2003 |
| DE | 4335342 B4 | 10/2004 |
| DE | 102007037733 A1 | 2/2008 |
| DE | 102006040991 A1 | 3/2008 |
| DE | 102011076745 A1 | 12/2012 |
| EP | 0562226 A1 | 9/1993 |
| EP | 1378677 A2 | 1/2004 |
| EP | 1454075 B1 | 1/2006 |
| GB | 2374124 A | 10/2002 |
| JP | S50-005338 B1 | 3/1975 |
| JP | H06-042558 A | 2/1994 |
| JP | 2006-071100 A | 3/2006 |
| KR | 20090059482 A | 6/2009 |
| WO | WO94/28326 A1 | 12/1994 |
| WO | WO01/14747 A1 | 3/2001 |
| WO | WO01/14759 A1 | 3/2001 |
| WO | WO2007/016493 A1 | 2/2007 |
| WO | WO2009/030574 A1 | 3/2009 |
| WO | WO2011/062856 A1 | 5/2011 |
| WO | WO2012/024497 A2 | 2/2012 |
| WO | WO2012/112283 A2 | 8/2012 |
| WO | WO2014/047430 A1 | 3/2014 |

OTHER PUBLICATIONS

International Search Report and Written Opinion from PCT Application Serial No. PCT/US2014/023260, dated Jun. 24, 2014, 12 pages.

Supplementary European Search Report from European Application No. EP14773788, dated Nov. 2, 2016.

\* cited by examiner

VISCOUS CLUTCH AND ASSOCIATED FLUX CIRCUIT CONFIGURATION

CROSS-REFERENCE TO RELATED APPLICATION(S)

This application is a continuation of U.S. application Ser. No. 14/775,002 filed Sep. 11, 2015, entitled VISCOUS CLUTCH AND ASSOCIATED RESERVOIR CONFIGURATION, which is a 35 U.S.C. § 371 National Phase Application of PCT Application No. PCT/US2014/023260 filed Mar. 11, 2014, entitled VISCOUS CLUTCH AND ASSOCIATED RESERVOIR CONFIGURATION, which in turn claims the benefit of U.S. Provisional Application No. 61/782,440 filed Mar. 14, 2013, entitled VISCOUS CLUTCH WITH SEPARATE RESERVOIR OR ROTATABLE RESERVOIR, each of which is hereby incorporated by reference in their entireties.

BACKGROUND

The present invention relates generally to clutches, and more particularly to viscous clutches.

Viscous clutches are used in a wide variety of automotive fan drive applications, among other uses. These clutches typically employ relatively thick silicone oil (more generally called shear fluid or viscous fluid) for the selective transmission of torque between two rotatable components. It is possible to engage or disengage the clutch by selectively allowing the oil into and out of a working area of the clutch located between input and output members (e.g., between an input rotor and an output housing). A valve is used to control the flow of the oil in the working area between the input and the output. Recent clutch designs have been employed that allow the oil to be stored in a reservoir attached to an input rotor while the clutch is disengaged, in order to keep kinetic energy available in the oil to allow rapid engagement of the clutch from the off condition. This also allows the clutch to have a very low output speed (e.g., fan speed) while the valve is positioned to obstruct oil flow into the working area. However, attachment of the reservoir to the rotor disk substantially limits design flexibility. For instance, many prior art clutches have limitations associated with magnetic flux circuits used for control of the valve, and positioning a valve relative to a rotating reservoir while still providing suitable fluid and flux paths presents formidable challenges. These constraints typically apply while still seeking to provide a relatively compact and low-mass clutch package that can still accommodate desired torque loads and function quickly, efficiently and reliably.

Therefore, it is desired to provide an alternative viscous clutch.

SUMMARY

In one aspect of the present disclosure, for example, a viscous clutch includes a shaft, a rotor attached to the shaft, a housing located adjacent to the rotor, a working chamber defined between the rotor and the housing, and a reservoir used to store a shear fluid. Selective introduction of the shear fluid to the working chamber facilitates selective torque transmission between the rotor and the housing.

The present summary is provided only by way of example, and not limitation. Other aspects of the present disclosure will be appreciated in view of the entirety of the present disclosure, including the entire text, claims and accompanying figures.

Figure 1:
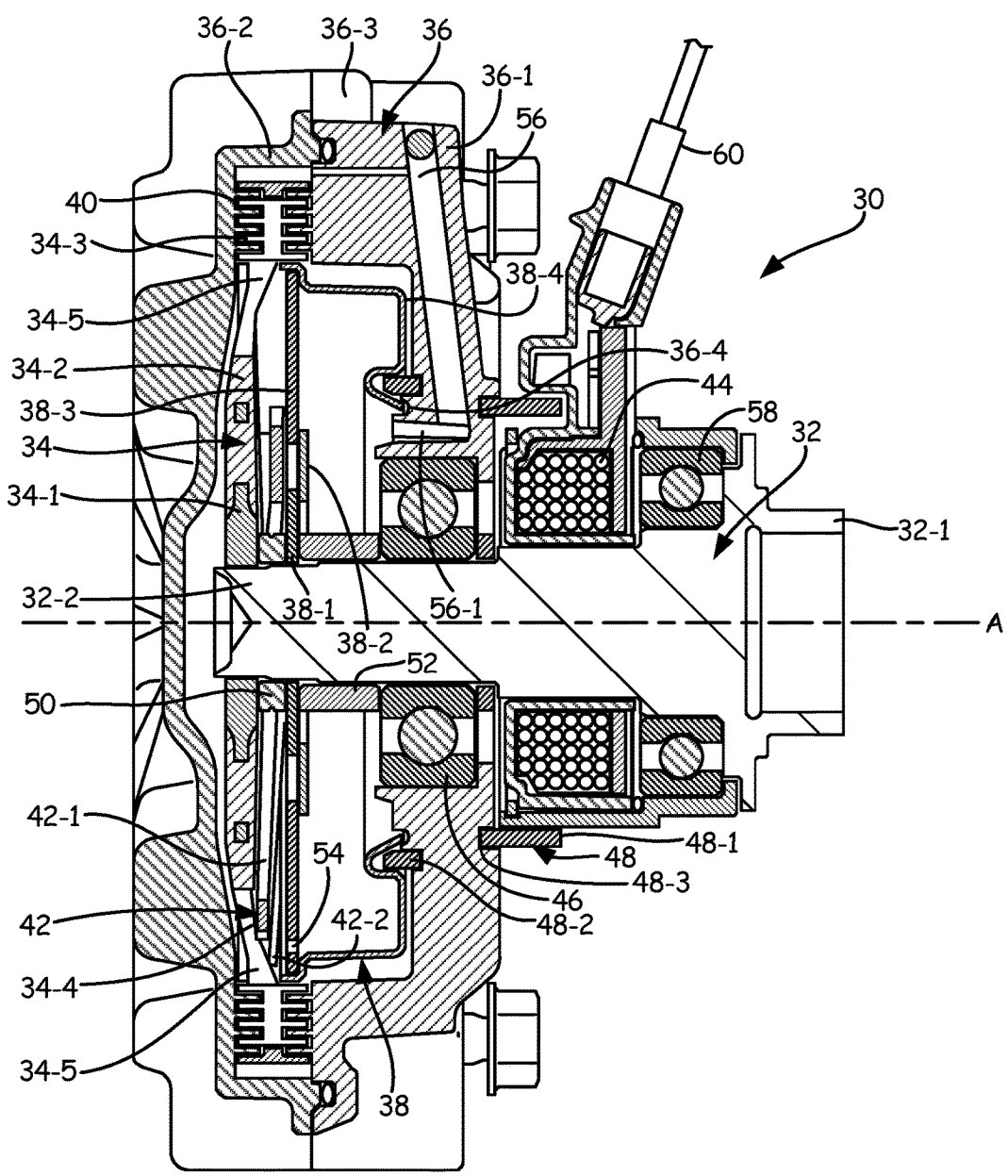
FIG. 1 is a cross-sectional view of one embodiment of a viscous clutch according to the present invention.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In general, the present invention provides a viscous clutch (also called a fluid friction coupling, liquid friction clutch, or the like) that decouples or separates a reservoir and a valve from a rotor disk that provides a rotational input to the clutch. The reservoir can be coupled to an input shaft and thus can rotate with the input shaft to provide kinetic energy to the reservoir and any fluid that the reservoir contains. A separate reservoir provides various advantages and benefits, such as improved abilities to control and adjust fluid flow from the reservoir to a working chamber, as well as allowing portions of a magnetic flux circuit (e.g., for controlling a valve) to be integrated into the reservoir to help provide a relatively compact and lightweight overall clutch package without a need for the flux circuit to traverse the rotor disk. Certain other features of the present invention are described further below, such as a generally annular contour or toroidal ridge in a wall of the reservoir to accommodate a protruding flux insert, a fluid bore having an angled (clocked) offset relative to a hole in the rotor disk, a fluid return bore that passes through a flux guide insert, and a slot-shaped return bore outlet. Persons of ordinary skill in the art will recognize numerous additional features and benefits of the invention in view of the attached figures and the description that follows. Moreover, it should be noted that while various preferred embodiments are shown and described herein, those embodiments are shown and described merely by way of example and not limitation, and additional embodiments are contemplated within the scope of the present invention.

The present application claims priority to U.S. Provisional Patent Application Ser. No. 61/782,440, entitled "Viscous Clutch With Separate Reservoir or Rotatable Reservoir," filed Mar. 14, 2013, which is hereby incorporated by reference in its entirety.

Figure 2:
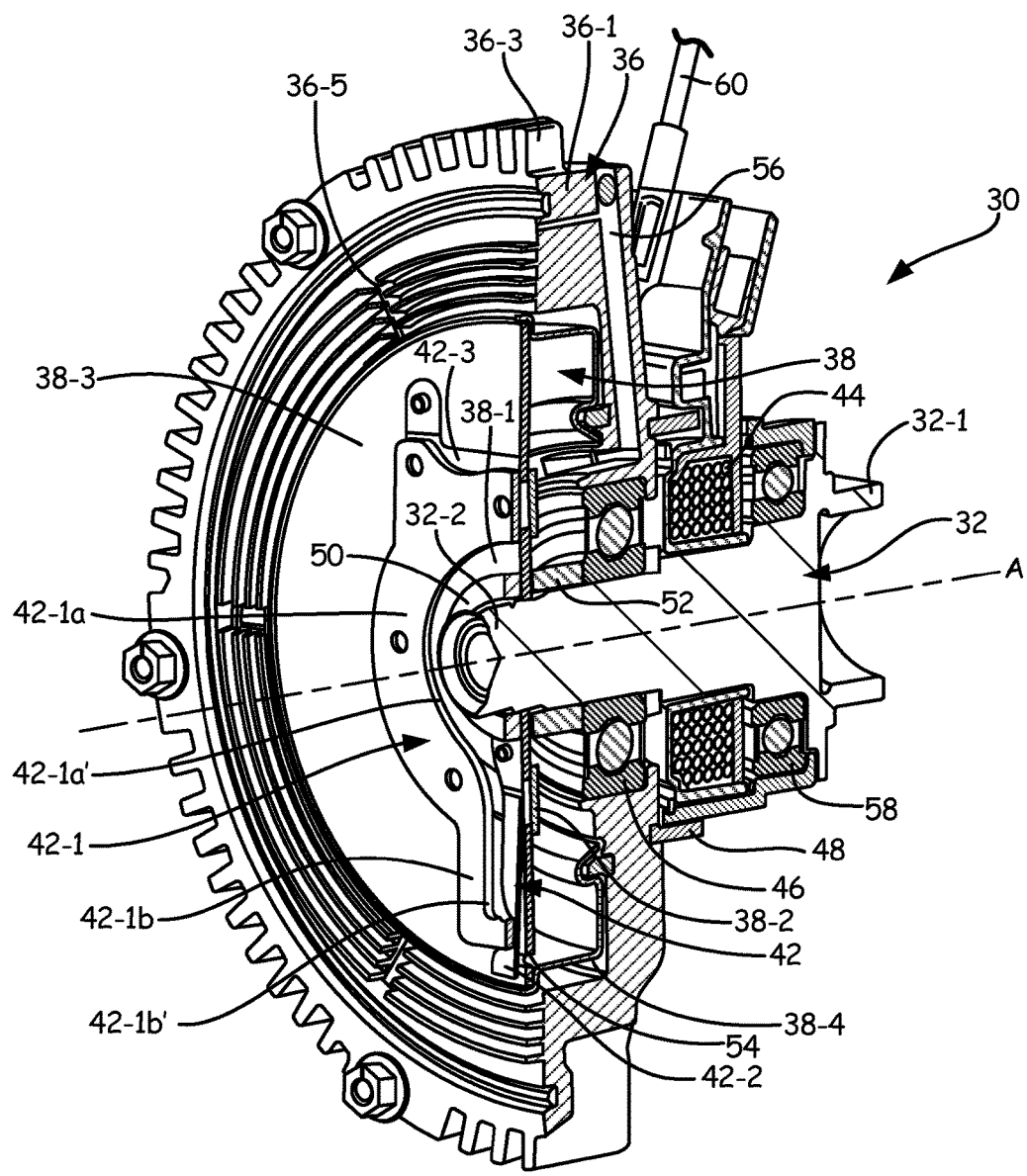
FIG. 2 is a cross-sectional perspective view of a portion of the viscous clutch of FIG. 1, shown with a cover and rotor disk omitted for illustrative purposes only.

FIGS. 1 and 2 illustrate one embodiment of a viscous clutch 30 that can be used to selectively drive a fan or other output component (not shown) as a function of a torque input to the clutch 30. FIG. 1 is a cross-sectional view of the clutch 30, and FIG. 2 is a cross-sectional perspective view of a portion of the clutch 30 with portions omitted to better reveal interior structures. The illustrated embodiment of the clutch 30 includes a drive (input) shaft 32, a rotor disk (or rotor) 34, a housing 36, a reservoir 38, a working chamber 40, a valve assembly 42, and an electromagnetic coil 44 (also called a solenoid). Additional components of the clutch 30 are discussed further below.

The drive shaft 32 has a first end 32-1 and an opposite second end 32-2, and can accept a rotational input to the clutch 30, such as from another shaft, a pulley, etc. (not shown). The drive shaft 32 is considered a "live" shaft because it rotates whenever there is a rotational input to the clutch 30. The drive shaft 32 provides structural support for other components of the clutch 30, and facilitates transmission of torque to certain other components. For instance, the first end 32-1 can be connected to a torque input and delivered at or near the second end 32-2. The drive shaft 32 generally defines an axis A of the clutch 32. It should be noted that the particular configuration of the shaft 32 is shown and described merely by way of example, and not limitation, and can vary as desired for particular applications. For instance, the present invention could be implemented with a clutch having a stationary shaft, in alternative embodiments.

The rotor disk 34 can be fixedly attached to the drive shaft 32 to rotate with the drive shaft 32. It should be noted that the rotor disk 34 is omitted in FIG. 2 merely for illustrative purposes, in order to better reveal other components of the clutch 30. In the illustrated embodiment, as shown in FIG. 1, the rotor disk 34 is connected at or near the second end 32-2 of the drive shaft 32 and can act as a rotational (torque) input member for the clutch 30. Moreover, in the illustrated embodiment, the rotor disk 34 includes an inner diameter insert 34-1 and an outer diameter portion 34-2. Ribs 34-3 or other suitable structures can be provided on one or both sides of the rotor disk 34 at or along the working chamber 40 (e.g., at the outer diameter portion 34-2). Additionally, a notch 34-4 can optionally be provided in the rotor disk 34 (e.g., at the outer diameter portion 34-2) to provide additional clearance for the valve assembly 42 (e.g., clearance in a generally axial direction). Still further, one or more holes (or windows) 34-5 can be provided through the rotor disk 34 (e.g., at the outer diameter portion 34-2) to allow shear fluid (e.g., silicone oil) to pass between opposite sides of the rotor disk 34 (see also FIG. 4). The particular configuration of the rotor disk 34 is shown and described merely by way of example, and not limitation, and can vary as desired for particular applications.

The housing 36 generally surrounds the rotor disk 34 and can act as a rotational (torque) output member, when the clutch 30 is selectively engaged. A further output element, such as a fan, pulley, output shaft, gear, pump, etc. (not shown), can be connected to the housing 36 to receive torque output from the clutch 30, as desired for particular applications. The housing 36 can be made in two parts, with a body 36-1 and a cover 36-2. The cover 36-2 is omitted in FIG. 2 merely for illustrative purposes, to better reveal interior components of the clutch 30. In the illustrated embodiment, the housing 36 is rotatably supported on the drive shaft 32 by suitable bearings 46. Cooling fins 36-3 can optionally be provided on an exterior of the housing 36 in a conventional manner to facilitate dissipation of thermal energy into ambient air. Again, it should be noted that the particular configuration of the housing 36 is shown and described merely by way of example, and not limitation, and can vary as desired for particular applications.

A flux insert (or flux guide) 48 can extend through the body 36-1 to help guide magnetic flux generated by the electromagnetic coil 44 through the housing 36 to control operation of the valve assembly 42. In the illustrated embodiment, the flux insert 48 includes a first end 48-1 positioned proximate to the electromagnetic coil 44 (i.e., within a flux range of the coil 44), an opposite second end 48-2, and one or more openings 48-3. The second end 48-2 can be radially offset relative to the first end 48-1. One or both of the first and second ends 48-1 and 48-2 of the flux insert 48 can stand proud from the housing 36. For instance, in the illustrated embodiment the second end 48-2 axially protrudes into an interior cavity of the housing 36 adjacent to the reservoir 38, and the first end 48-1 axially protrudes from the housing 36 adjacent to the electromagnetic coil 44. The one or more openings 48-3 can be located in a generally middle region of the flux insert 48, in between the first and second ends 48-1 and 48-2. The openings 48-3 can help reduce a mass of the flux insert 48, help allow the flux insert 48 to be firmly retained by the housing 36, and provide other benefits discussed further below. The flux insert 48 can be made of a magnetic flux conducting material, such as non-alloyed iron, steel, etc., and material of the body 36-1 of the housing 36 (e.g., aluminum) can be cast about the flux insert 48 to secure the insert 48 therein. The embodiment of the flux insert 48 is shown and described merely by way of example, and can be implemented in alternative embodiments as desired for particular applications.

The reservoir 38 can be positioned within the housing 36, and can be fixedly attached to the drive shaft 32 to rotate with the drive shaft 32 whenever a torque input to the shaft 32 is present. The reservoir 38 can hold a supply of shear fluid during at least some operating conditions of the clutch 30, with the reservoir 38 typically holding a majority of the shear fluid when the clutch 30 is in a disengaged condition. Rotation of the reservoir 38 when a torque input is provided to the clutch 30 can impart kinetic energy to shear fluid contained in the reservoir 38, which can help provide relatively quick engagement of the clutch 30.

The reservoir 38 can be configured as a multi-piece assembly that includes a first (or inner) piece 38-1, a second (or intermediate) piece 38-2, a third (or outer) piece 38-3, and a fourth (or cap) piece 38-4, though in further embodiments the reservoir 38 could be constructed from a larger or smaller number of discrete pieces. The first piece 38-1 can be positioned generally radially inwardly and attached directly to the drive shaft 32, and can have a generally planar, disk-like shape. The second piece 38-2 can also have a generally planar, disk-like shape, and can be attached to the first piece 38-1 at or near an outer diameter portion of the first piece 38-1. The third piece 38-3 can also have a generally planar, disk-like shape, and can be attached to the second piece 38-2 at or near an outer diameter portion of the second piece 38-2. In the illustrated embodiment, the first and third pieces 38-1 and 38-3 are substantially axially aligned, while the second piece 38-2 is axially offset (e.g., toward a rear side of the clutch 30). The fourth piece 38-4 can be attached to the third piece 38-3 at or near an outer diameter portion of the third piece 38-3, and can extend away from the third piece 38-3 as measured in the axial direction. Accordingly, the first, second and third pieces 38-1 to 38-3 can all generally face the rotor disk 34, while the fourth piece 38-4 can generally face away from the rotor disk 34. Some or all of the pieces 38-1 to 38-4 can form a corresponding portion of a wall (i.e., reservoir wall or boundary wall) of the reservoir 38. In that way, the pieces 38-1 to 38-4 of the reservoir 38 can collectively provide a volume for storing the shear fluid defined within a boundary established by the wall. The various pieces of the reservoir 38 can be attached together in any suitable manner, such as using welding, brazing, mechanical fasteners, swaging, pressing, threading, adhesive, or any other suitable attachment, joining, connecting or bonding method. The particular configuration of the reservoir 38 and associated sub-components illustrated in the figures and described herein are merely examples, and persons of ordinary skill in the art will appreciate that further embodiments are possible, as desired for particular applications.

Figure 3:
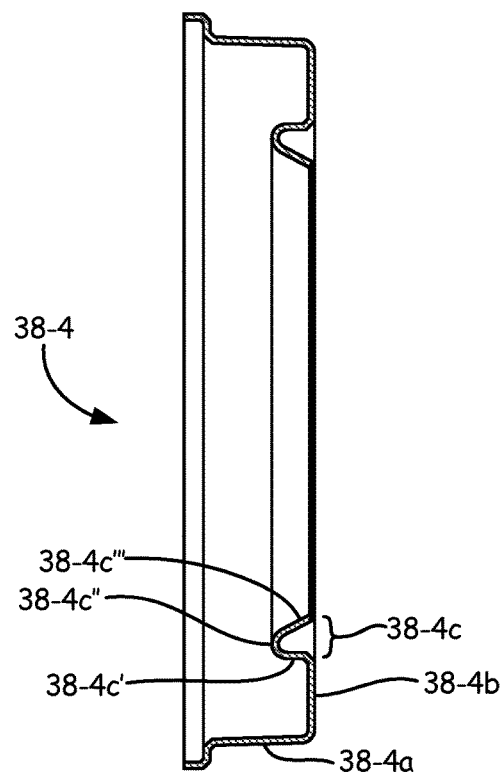
FIG. 3 is a cross-sectional view of a portion of a reservoir of the viscous clutch of FIGS. 1 and 2, shown in isolation.

FIG. 3 is a cross-sectional view of the fourth (or cap) piece 38-4, shown in isolation. As shown in the illustrated embodiment, the fourth (or cap) piece 38-4 has a first portion 38-4a that can extend generally axially, a second portion 38-4b extending generally radially from the first portion 38-4a, and a ridge portion 38-4c that is connected to the second portion 38-4b generally opposite the first portion 38-4a. The ridge portion 38-4c is generally toroidal in shape and can include a generally axially extending first part 38-4c', a second part 38-4c'', and a third part 38-4c'''. The second part 38-4c'' can be curved, and can join the first and third parts 39-4c' and 39-4c''' (which can be located away from each other, spaced apart by the second part 38-4c''). The first part 38-4c' can be substantially cylindrical in shape and arranged generally axially, that is, extending generally parallel to the axis A. The third part 38-4c''' can be substantially frusto-conical in shape and orientated at a different angle than the first part 38-4c' relative to the axis A. In the illustrated embodiment, the third part 38-4c''' has a distal end angled away from the first part 38-4c'. The first part 38-4c' can be located at a radially outward portion of the ridge 38-4c, and the third part 38-4c''' can be located at a radially inward portion of the ridge 38-4c. Further, the third part 38-4c''' can extend to an edge of the boundary wall of the reservoir 38. The ridge portion 38-4c provides space to accommodate protrusion of the second end 48-2 of the flux insert 48 out of the housing 36. That is, the ridge portion 38-4c can wrap around the second end 48-2 of the flux insert 48. In that way, the second end 48-2 of the flux insert 48 can extend at least partially into the ridge portion 38-4c with an axial overlap. A groove 36-4 can be provided in the housing 36 adjacent to the second end 48-2 of the flux insert 48, and the third part 38-4c''' can at least partially extend into the groove 36-4. In the illustrated embodiment, the ridge portion 38-4c can surround and radially traverse the protruding second end 48-2 of the flux insert 48, which can help keep shear fluid away from the flux insert 48 and help reduce a risk of fluid leakage while still being closely spaced from the base 36-1 of the housing 36 to help maximize storage volume within the reservoir 38 and minimize a flux gap between the reservoir 38 and the flux insert 48. Furthermore, the ridge portion 38-4c exposes a relatively large surface area to the flux insert 48, to help maximize flux transmission, as described further below.

Turning again to FIGS. 1 and 2, the reservoir 38 as shown in the illustrated embodiment is separate from the rotor disk 34 and is independently supported on the drive shaft 32. More specifically, the reservoir 38 can be attached to the drive shaft 32 at a different axial location than the rotor disk 34. A spacer 50, which can be made of a non-magnetic flux conductive material (e.g., austenitic stainless steel), can be positioned on the drive shaft 32 between the rotor disk 34 and the reservoir 38. The valve assembly 42 can be substantially axially aligned with the spacer 50 in some embodiments. Additionally, or in the alternative, another spacer 52 can be positioned between the reservoir 38 and the bearings 46 that support the housing 36. The spacer 52 can also which can be made of a non-magnetic flux conductive material (e.g., austenitic stainless steel). The spacers 50 and 52 can help provide desired axial spacing of various components along the drive shaft 32, and can further facilitate magnetic separation or isolation between components on opposing sides of each spacer 50 and 52. When the clutch 30 is fully assembled, a compressive load can optionally be applied to help hold a stack of components on the drive shaft 32, which can hold the spacers 50 and/or 52 in physical contact with adjacent components.

Portions of the reservoir 38 can be made of steel, iron, aluminum, stainless steel or any combination of these materials, or other suitable materials. For example, in the illustrated embodiment, the first, third and fourth pieces 38-1, 38-3 and 38-4 of the reservoir 38 are made of a magnetic flux conducting material (e.g., ferromagnetic materials), whereas the second piece 38-2 is made of a non-magnetic flux conducting material (e.g., austenitic stainless steel, aluminum, etc.). With such a configuration, one or more portions of the reservoir 38 can form a part of a flux circuit for the clutch. Further, the second piece 38-2 can interrupt magnetic flux transmission through the remainder of the reservoir 38, thereby providing magnetic separation or isolation between the first piece 38-1 and both the third and fourth piece 38-3 and 38-4, and allowing different magnetic flux conductive portions of the reservoir 38 to form different portions of the overall magnetic flux circuit of the clutch 30. Alternatively, or in addition, one or more additional flux inserts and/or flux guiding pieces can be inserted into or otherwise attached to the reservoir 38 to provide a flux path through or around the reservoir 38. Magnetic flux transmission within the clutch 30 is discussed further below.

A supply bore 54, governed by the valve assembly 42, can be provided on the reservoir 38 to allow shear fluid to exit the reservoir 38 and pass toward the working chamber 40. In the illustrated embodiment, the supply bore 54 is located near an outer diameter of the third piece 38-3 of the reservoir 38 and faces the rotor disk 34, but could be positioned elsewhere on the reservoir 38 in alternative embodiments.

Figure 4:
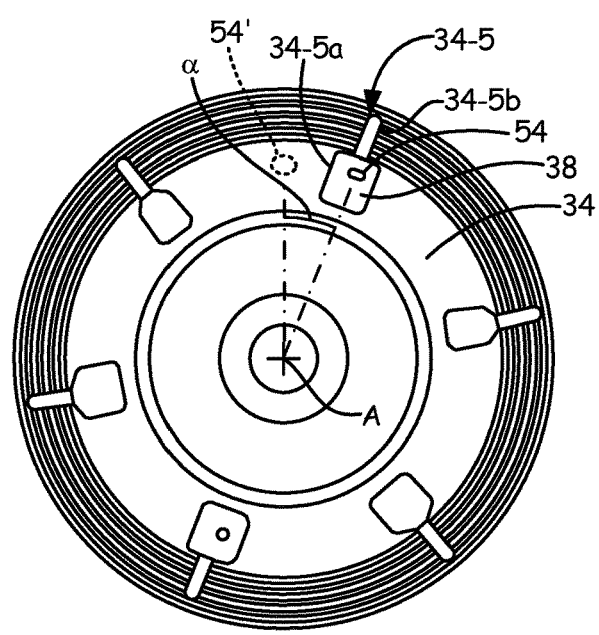
FIG. 4 is a perspective view of a rotor disk and the reservoir of FIGS. 1-3, shown in isolation.

FIG. 4 is a perspective view of the rotor disk 34 and the reservoir 38 shown in isolation. As shown in the illustrated embodiment, the holes (or windows) 34-5 in the rotor disk 34 have a first, radially inner portion 34-5a that is rectangular and approximately square in shape, and a second, radially outer portion 34-5b that is elongate in shape and narrower (in a circumferential direction) than the first portion 34-5a. The first and second portions 34-5a and 34-5b can be contiguous and in fluid communication with each other, and can each extend entirely through an axial thickness of the rotor disk 34 (i.e., extending between opposite front and rear sides of the rotor disk 34). As shown in FIG. 4, the first portion 34-5a can generally align or overlap with an outer diameter portion of the reservoir 38, while the second portion 34-5b can be located generally radially outward of the reservoir 38 and can extend into an outer diameter region of the rotor disk 34 where ribs extend from the rotor disk 34 and the working chamber 40 (see FIG. 1)

is defined. Any desired number of angularly spaced holes 34-5 can be provided in the rotor disk 34. Six holes 34-5 are shown in the illustrated embodiment, but merely by way of example and not limitation. One or more of the holes 34-5 can be positioned at approximately the same radial distance from the axis A as the supply bore 54, that is, the holes 34-5, or at least the first portion 34-5a, can be located at a common radial position with the supply bore 54. The supply bore 54 is shown in FIG. 4 radially aligned and angularly aligned (clocked) with one of the holes 34-5 in the rotor disk 34 (e.g., aligned with the first portion 34-5a), such that shear fluid exiting the supply bore 54 is presented with a substantially clear, line-of-sight path through one of the holes 34-5, allowing the shear fluid to pass substantially unobstructed from the supply bore 54 to an opposite (front) side of the rotor disk 34 in generally the axial direction. In other words a center of the supply bore 54 is arranged at an angle α (measured about the axis A) relative to a center of the hole 34-5, and in the illustrated embodiment the angle α is approximately 0°. However, in further embodiments, the supply bore 54 can be positioned at a range of angle offsets (clocking positions) relative to the rotor disk 34 to help provide relatively faster or slower shear fluid flow toward and through the working chamber 40. The angle α can be selected to position the supply bore 54 at any angularly offset position between adjacent holes 34-5. For example, the angle α can be selected to have any desired angular offset, continuously variable within a range of approximately +/−60° (clockwise or counter-clockwise). In a further preferred embodiment, the angle α can be selected within a range of approximately +/−30°, or within a range of +/−15°, or any other desired range. More specifically, the angle α can be selected as 60°, 30°, 15°, −60°, −30°, −15°, etc. in certain embodiments. In still further embodiments, the angle α can be selected to be +/−360°/(n·2), where n is a total number of the holes 34-5 in the rotor disk 34 and the angle α represents the angular offset between the supply bore 54 and an adjacent one of the n holes 34-5. For illustrative purposes, a possible alternate, offset position of the supply bore 54' is shown in phantom. In some embodiments, the supply bore 54 (or 54') is offset by the angle α such that the supply bore 54 is angularly or circumferentially spaced from any of the holes 34-5 in the rotor disk 34, that is, so that the bore 54' is not angularly aligned with any of the holes 34-5. Such a spaced, offset embodiment tends to slow the flow of shear fluid toward and through the working chamber 40 along a fluid supply path, because there is no clear, line-of-sight path from the bore 54' through one of the holes 34-5 in generally the axial direction. In this way, the clocking of the supply bore 54 relative to the holes 34-5 can allow for adjustment of operating characteristics of the clutch 30 in a fairly easy manner. For instance, clocking of the rotor disk 34 and/or the reservoir 38 can be adjusted during assembly of the clutch 30 without requiring redesign of the clutch 30.

Turning again to FIG. 1, the working chamber 40 is defined between the rotor disk 34 and the housing 36, and the shear fluid can be selectively introduced to the working chamber 40 to selectively couple the rotor disk 34 and the housing 36 to transmit torque. The working chamber 40 and the reservoir 38 can be part of a fluid circuit that includes the supply path and a return path. As shown in the illustrated embodiment, the supply bore 54 on the reservoir 38 can be selectively covered and uncovered by the valve assembly 42 to selectively pass the shear fluid to the working chamber 40 along the supply path. Fluid in the working chamber 40 can be returned to the reservoir 38 along the return path by passing through a return bore 56. A pump element (not specifically shown) can optionally be provided at or along the working chamber 40 to help pump the shear fluid from the working chamber 40 to the reservoir 38 in a conventional manner. Generally radially extending grooves 36-5 (e.g., interruptions of circumferential ribs, depressions, etc.) can be provided in the housing 36 (or alternatively in the rotor disk 34) along the working chamber 40 to facilitate flow of the shear fluid.

In the illustrated embodiment, as shown in FIGS. 1 and 2, the return bore 56 extends from the working chamber 40 through the body 36-1 of the housing 36. The return bore 56 can pass through one of the openings 48-3 in the flux insert 48, thereby facilitating a compact overall clutch design. An outlet 56-1 of the return bore 56 allows shear fluid to pass from the return bore 56 to the reservoir 38. In the illustrated embodiment, the outlet 56-1 is configured as a tapered slot (e.g., tapered in a generally radial direction with a mouth that is wider than an interior portion) located generally radially inward from the flux insert 48, with the outlet 56-1 positioned adjacent to the groove 36-4 in the housing 36 and the ridge 38-4c in the reservoir 38. The taper of the outlet 56-1, together with the overlap of the groove 36-4 and the third part 38-4c''' of the ridge 38-4c allows the shear fluid to pass relatively smoothly and easily radially outwardly into the reservoir 38, without significant risk of obstruction or leakage (such as that potentially caused by the protrusion of the flux insert 48).

The valve assembly 42 in the illustrated embodiment is configured to operate in a manner similar to that disclosed in commonly-assigned PCT Publication No. WO 2012/024497, entitled "Viscous Clutch Valve Assembly." The valve assembly 42 can include a generally axially pivoting armature 42-1 and a generally axially pivoting reed valve 42-2, though in alternative embodiments other types of valve assemblies can be utilized, such as those utilizing rotating valve elements, translating valve elements, etc. In the illustrated embodiment, the valve assembly 42 is attached to the reservoir and, in the axial direction, is positioned, at least partially, in a gap located in between the reservoir 38 and the rotor disk 34, and likewise in between the rotor disk 34 and the electromagnetic coil 44. During operation, the valve assembly 42 (including the armature 42-1 and the reed valve 42-2) is pivotable between a first, open position and a second, closed position, with the valve assembly positioned in between the rotor disk 34 and the reservoir 38 in both the first and second positions. FIGS. 1 and 2 illustrate the valve assembly 42 in the first, open position. As previously noted, the optional notch 34-4 in the rotor disk 34 can provide added clearance for pivoting of the valve assembly 42, and in particular for the armature 42-1 when the valve assembly 42 is in the first, open position. Although a variety of manufacturing processes can be used, rivets or other suitable fasteners can be secured to the reservoir 38 to connect the armature 42-1 by way of an anchor spring 42-3 (e.g., a leaf spring), which can provide a relatively highly reliable steel-to-steel connection. If the armature 42-1 and the anchor spring 42-3 were attached to the rotor disk 34 as in various prior art configurations, an aluminum rivet-to-steel connection would typically be provided, which would be less reliable.

As best shown in FIG. 2, the illustrated embodiment of the valve assembly 42 includes the anchor spring 42-3 attached to the third piece 38-3 of the reservoir 38, and the armature 42-1 in turn attached to the anchor spring 42-3 in a pivotable configuration. The armature 42-1 can have a generally flat or planar shape, with a ring-shaped base portion 42-1a having a central opening 42-1a' that surrounds the drive shaft 32 as well as an extension 42-1*b* that radially protrudes from the base portion 42-1*a*. The base portion 42-1*a* can have a sufficient radial dimension to span the second piece 38-2 of the reservoir 38, allowing the armature 42-1 to contact both the first and third pieces 38-1 and 38-3 of the reservoir 38 during certain operating conditions. The extension 42-1*b* can be located diametrically opposite the anchor spring 42-3, relative to the axis A. In the illustrated embodiment, the extension 42-1*b* is configured like a generally rectangular loop, with an internal opening 42-1*b*' that is contiguous with, and merges with, the central opening 42-1*a*'. The openings 42-1*a*' and 42-1*b*' can help reduce weight of the valve assembly 42 and help accommodate packaging the clutch 30 around the drive shaft 32. Furthermore, the reed valve 42-2 can be separately attached to the reservoir 38 from the armature 42-1. In the illustrated embodiment, the reed valve 42-2 is attached to the first piece 38-1 of the reservoir 38. The anchor spring 42-3 can provide a defined bending location and prescribed rotational motion of the valve assembly 42, and can further provide a spring bias that tends to force the armature 42-1 and the reed valve 42-3 closed in the illustrated embodiment. Actuation of the valve assembly, as explained further below, can cause the armature 42-1 to pivot and press against the reed valve 42-2. The reed valve 42-2 can be biased away from the supply bore 54 by default, and force from the armature 42-1 can overcome the default biasing of the reed valve 42-2 such that the reed valve 42-2 pivots or bends to partially or completely cover the supply bore 54. In this way, actuation of the valve assembly 42 allows the supply bore 54 to be selectively covered and uncovered to regulate flow of the shear fluid from the reservoir 38 to the working chamber 40.

The electromagnetic coil 44 can be arranged at a rear portion of the clutch 30 and rotatably supported on the drive shaft 32 by bearings 58. A tether 60 or other suitable structure can rotationally fix the electromagnetic coil 44 relative to a mounting location of the clutch (which can be in a vehicle, etc.). The electromagnetic coil 44 can be selectively energized in order to control operation of the valve assembly 42. A coil housing can optionally be provided around at least a portion of the electromagnetic coil 44.

In order to actuate the valve assembly 42 using the electromagnetic coil, magnetic flux can be guided through portions of the clutch 30 along the flux circuit (also called a flux loop or flux path). In the illustrated embodiment, magnetic flux can be transferred along the flux circuit from the electromagnetic coil 44 across a gap to the flux insert 48 across another gap to the reservoir 38 (e.g., the fourth and third pieces 38-4 and 38-3) to the valve assembly (e.g., the armature 42-1 and optionally the reed valve 42-2), and back to the reservoir 38 (e.g., the first piece 38-1), to the drive shaft 32 and back to the electromagnetic coil 44.

During operation, the electromagnetic coil 44 can be selectively energized to move the armature 42-1, which can in turn move the reed valve 42-2 relative to the supply bore 54. Selective control of the valve assembly 42 to cover and uncover the supply bore 54 over time can control the amount of the shear fluid that enters the working chamber 40, and in turn a degree of torque transmission by the housing 36 relative to the torque input to the drive shaft 32 (and the rotor disk 34). In one embodiment, the reed valve 42-2 is biased to an open position to uncover the supply bore 54 by default, and energizing the electromagnetic coil 44 can allow the armature 42-1 and reed valve 42-2 to be moved to a closed position that at least partially covers the supply bore 54. When moved to a closed position to cover the supply bore 54, a seating portion (e.g., a distal end spaced from the fulcrum or pivot point) of the reed valve 42-2 of the valve assembly 42 can rest against the reservoir 38. Moreover, when pulled to a closed position the valve assembly 42 of the illustrated embodiment can move the reed valve 42-2 and armature 42-1 toward both the reservoir 38 and the electromagnetic coil 44. Pulling components of the valve assembly 42 toward the electromagnetic coil 44 helps improve efficiency of flux transmission and valve actuation, and can facilitate the use of less power and/or a relatively small coil 44. In certain embodiments, pulse width modulation (PWM) or other suitable control methodologies can be utilized to govern energization of the electromagnetic coil 44 and actuation of the valve assembly 42.

Figure 1A:
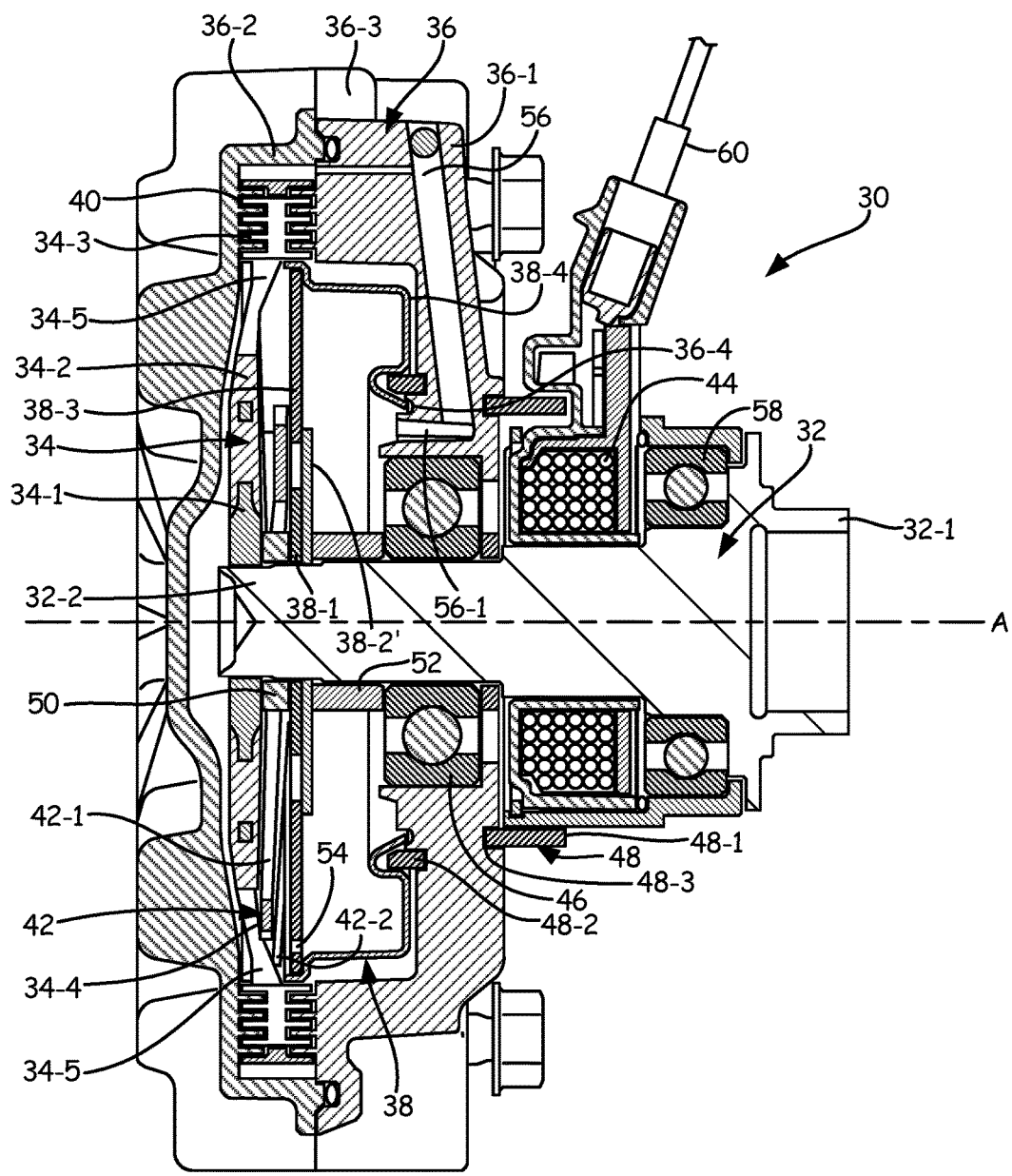
FIGS. 1A-1C are cross-sectional views of alternate embodiments of the viscous clutch of FIG. 1.
Figure 1B:
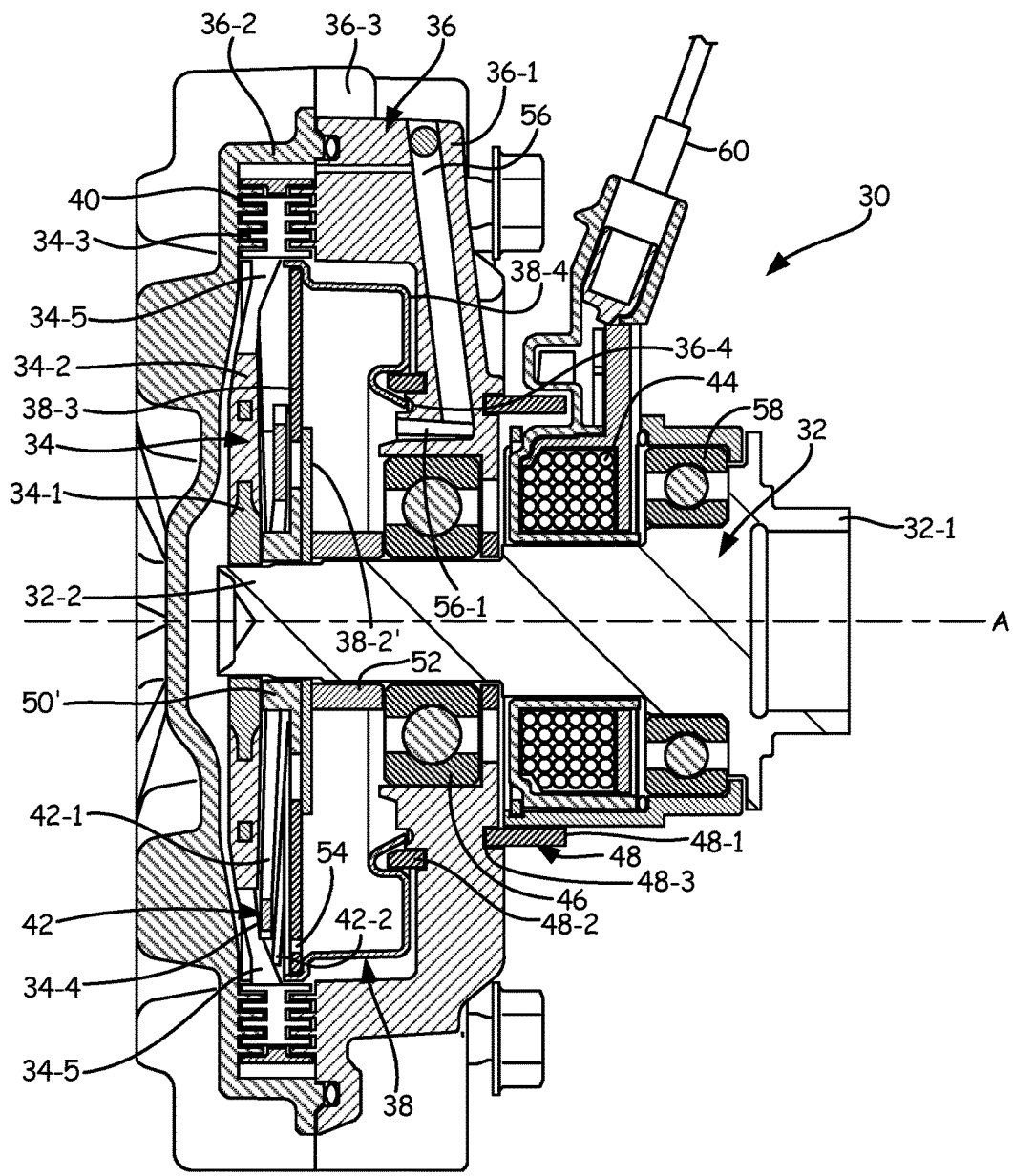
Figure 1C:
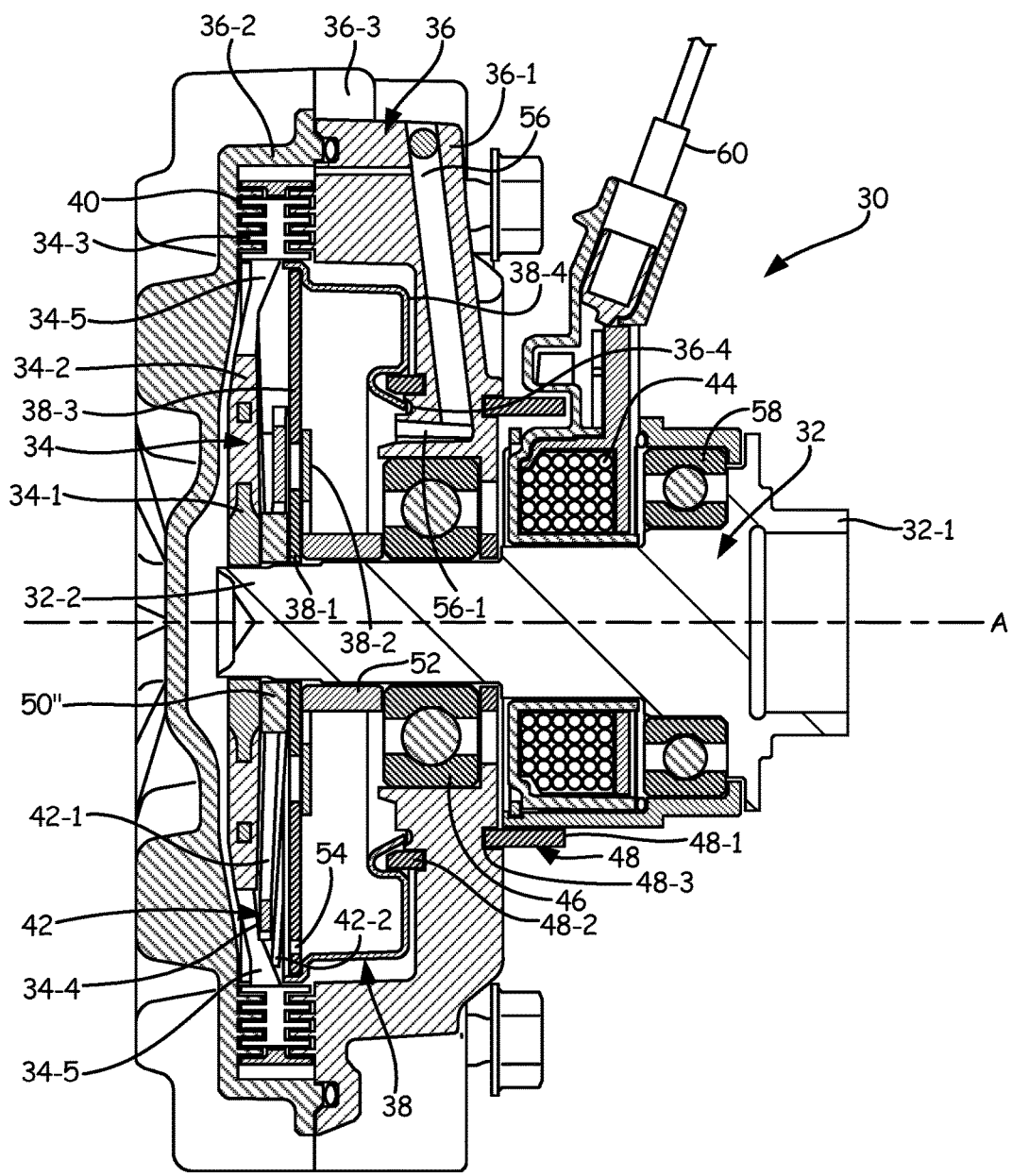

A variety of alternative embodiments of the reservoir 38 and/or flux circuit of the clutch 30 are possible. For instance, FIGS. 1A-1C are cross-sectional views of possible alternate embodiments of the viscous clutch 30. In the embodiment shown in FIG. 1A, a second piece 38-2' of the reservoir 38 can extend to and be connected to the drive shaft 32. The first piece 38-1 therefore need not be a structural part of the reservoir 38 in the embodiment of FIG. 1A, but can be a structurally separate flux guiding component of the flux circuit. In the embodiment shown in FIG. 1B, the second piece 38-2' of the reservoir 38 can extend to and be connected to the drive shaft 32. Moreover, a spacer 50' can be integrally and monolithically made with a pole piece (e.g., integrating the first piece 38-1 and the spacer 50 of previously-described embodiments). The spacer 50' is made of magnetically flux conductive material in the embodiment of FIG. 1B. Additionally, in the embodiment shown in FIG. 1C, a spacer 50" is made of a magnetically flux conductive material and extends into close proximity to the armature 42-1, such that a radial air gap is provided within the flux circuit of the clutch 30. In this way, the spacer 50" can help to enhance operation of the flux circuit by providing an additional magnetic pathway in addition to the first piece 38-1, albeit with a radial air gap rather than an axial air gap. In still further embodiments, the spacer 50" and the first piece 38-1 can be combined into a unitary and monolithic piece.

Persons of ordinary skill in the art will recognize that the embodiments of the present invention discussed above can provide numerous advantages and benefits. For example, mounting the valve assembly 42 to the reservoir 38 allows the clutch 30 to have two magnetically-attractive surfaces to pull the armature 42-1 and reed valve 42-2 closed, which can create higher magnetic forces compared to a single magnetically-attractive surface. Moreover, the armature 42-1 of the valve assembly 42 can be pulled toward the electromagnetic coil 44, which can help improve efficiency. Additionally, magnetic flux in the flux circuit can be transferred along a path that is away from the bearing 46, helping to minimize magnetic loss. The reed valve 42-2 can be located between the rotor disk 34 and the electromagnetic coil 44, which helps reduce an overall size of the magnetic flux circuit and can correspondingly help reduce the size and output requirements of the electromagnetic coil 44. These reductions, particularly with respect to the electromagnetic coil 44, can help reduce weight of the clutch 30 and reduce the need for additional wiring (typically copper) in the electromagnetic coil 44. Numerous other features and benefits are obtained with the present invention beyond those explicitly mentioned.

A number of further alternative embodiments are also contemplated, some of which are described below with reference to FIGS. 5-9. In general, reference characters used in FIGS. 5-9 are similar to those used with respect to the embodiment shown in FIGS. 1-4, but with values incremented by one hundred in each alternative embodiment. However, it should be noted that the alternative embodiments described below are not exhaustive of possible implementations of various aspects of the present invention.

Figure 5:
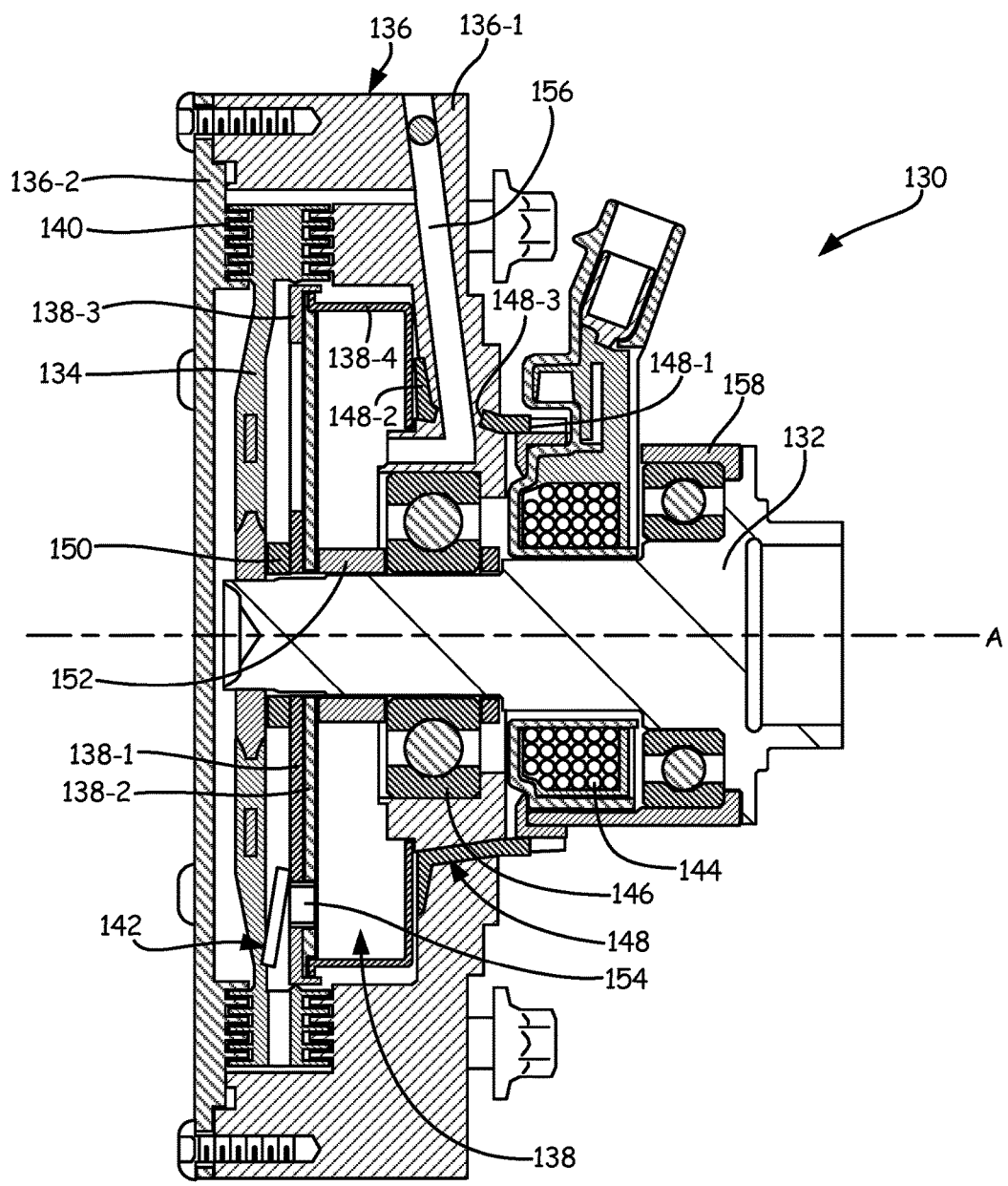
FIG. 5 is a cross-sectional view of another embodiment of a viscous clutch according to the present invention.

FIG. 5 is a cross-sectional view of another embodiment of a viscous clutch 130. The viscous clutch 130 has many similarities to the clutch 30 previously described, and therefore reference characters used in FIG. 5 are similar to those used with respect to the embodiment shown in FIGS. 1-4 but with values incremented by one hundred. As shown in FIG. 5, the clutch 130 includes a drive shaft 132, a rotor disk 134, a housing 136 (with a base 136-1 and a cover 136-2), a reservoir 138, a working chamber 140, a valve assembly 142, an electromagnetic coil 144, bearings 146, a flux insert 148 (having a first end 148-1, a second end 148-2, and an opening 148-3), spacers 150 and 152, a supply bore 154, a return bore 156 with a slot-shaped outlet 156-1, and bearings 158. The clutch 130 can function in a similar manner to that described with respect to the clutch 30. Some notable differences in the clutch 130 include a different shape of the flux insert 148 (compared to the flux insert 48), and a different configuration of the reservoir 138 (compared to the reservoir 38). The reservoir 138 can include first piece 138-1, second piece 138-2, third piece 138-3 and fourth piece 138-4. The second piece can be made of a non-magnetic flux conducting material, while the first, third and fourth pieces 138-1, 138-3 and 138-4 can each be made of magnetic flux conducting material. The second piece 138-2 can be a generally planar disk-shaped member that radially extends between the drive shaft 132 and the fourth piece 138-4, and can help magnetically separate or isolate the first piece 138-1 from the third and fourth pieces 138-3 and 138-4. The second end 148-2 of the flux insert 148 can include a tapered and radially outwardly extending portion, and can be arranged substantially flush with an interior wall of the base 136-1 of the housing 136.

Figure 6:
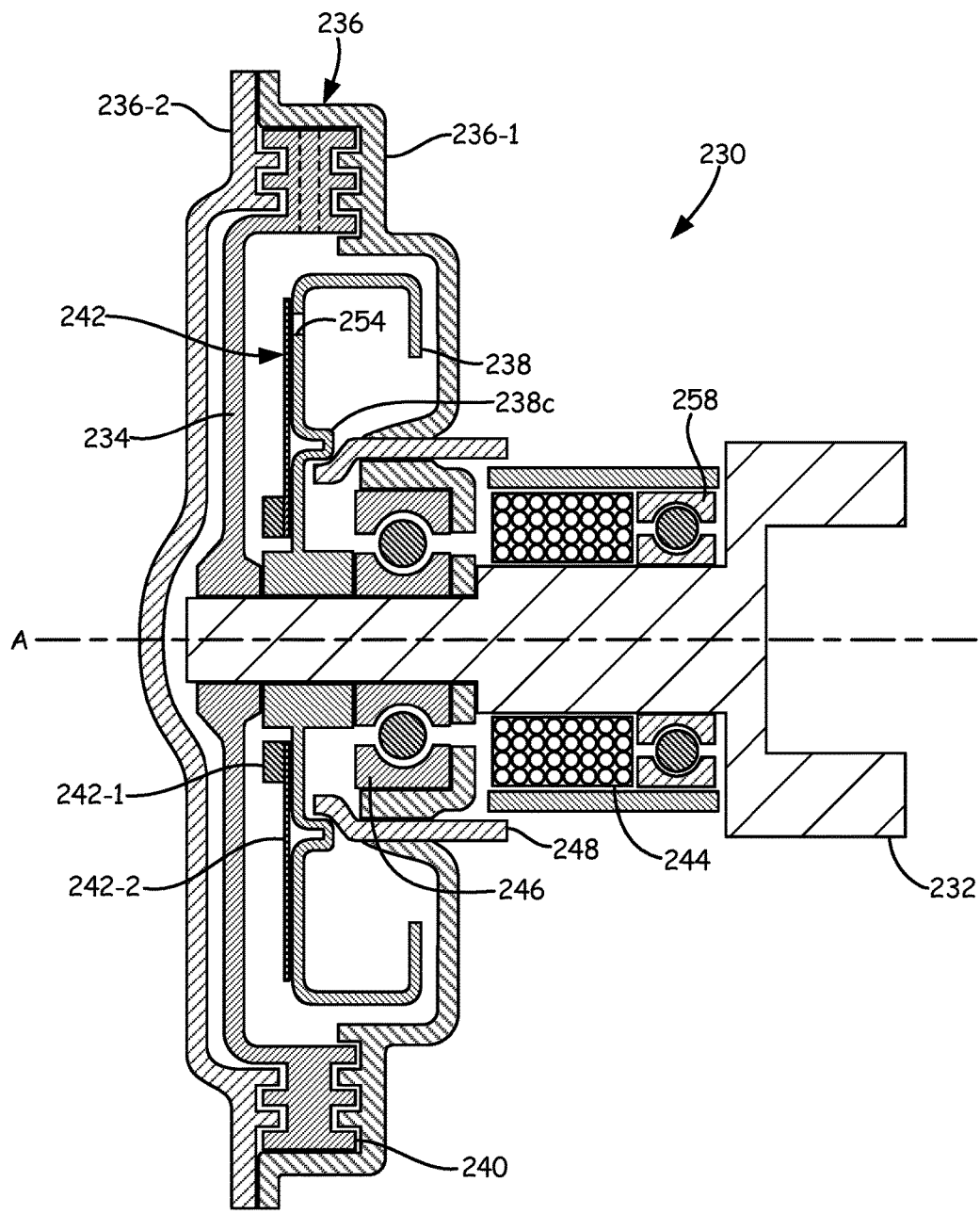
FIG. 6 is a cross-sectional view of another embodiment of a viscous clutch according to the present invention.

FIG. 6 is a cross-sectional view of another embodiment of a viscous clutch 230. The clutch 230 is similar in many respects to the embodiments of clutches 30 and 130 described above, and therefore reference characters used in FIG. 6 are similar to those used with respect to the embodiments shown in FIGS. 1-5 but with values incremented by one hundred above those in FIG. 5. As shown in FIG. 6, the clutch 230 includes a drive shaft 232, a rotor disk 134, a housing 236 (with a base 236-1 and a cover 236-2), a reservoir 238 (having a ridge portion 238c), a working chamber 240, a valve assembly 242 (with an armature 242-1 and a valve arm 242-2), an electromagnetic coil 244, bearings 246, a flux insert 248, a supply bore 254, and bearings 258. It should be noted that a return bore in the housing 236 is not shown in FIG. 6 for simplicity, but can be provided in a manner similar to that show and described with respect to the preceding embodiments. The clutch 230 can function in a similar manner to that described with respect to the embodiments of clutches 30 and 130.

Figure 7:
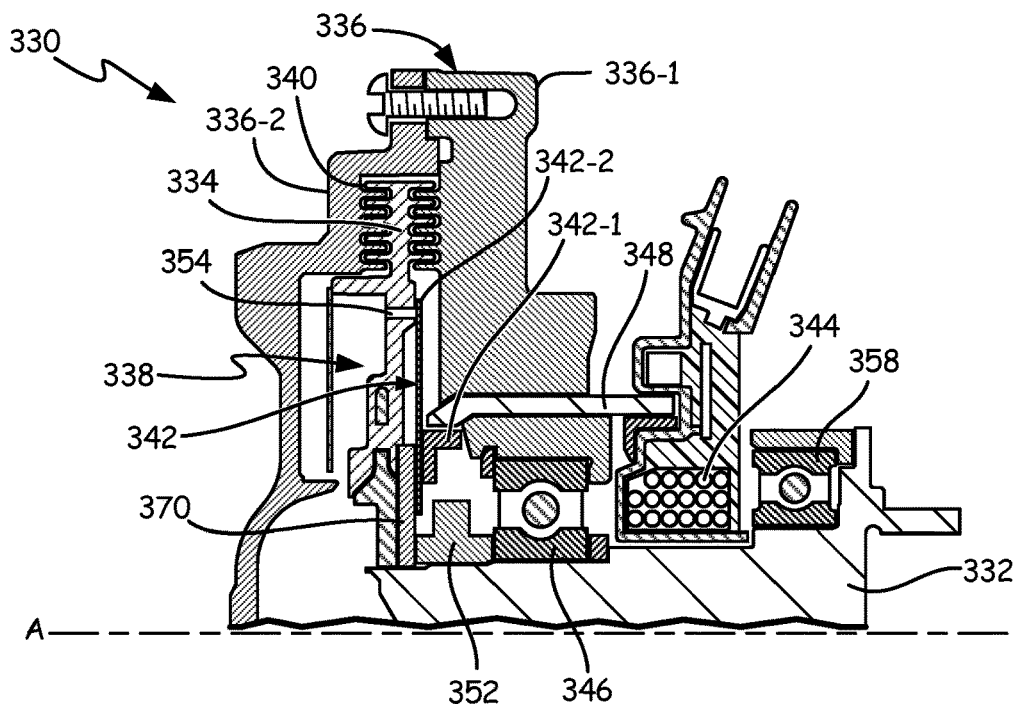
FIG. 7 is a partial cross-sectional view of another embodiment of a viscous clutch according to the present invention.

FIG. 7 is a partial cross-sectional view of another embodiment of a viscous clutch 330. The clutch 330 is similar in many respects to the embodiments of clutches 30, 130 and 230 described above, and therefore reference characters used in FIG. 7 are similar to those used with respect to the embodiments shown in FIGS. 1-6 but with values incremented by one hundred above those in FIG. 6. As shown in FIG. 7, the clutch 330 includes a drive shaft 332, a rotor disk 334, a housing 336 (with a base 336-1 and a cover 336-2), a reservoir 338, a working chamber 340, a valve assembly 342 (with an armature 342-1 and a valve arm 342-2), an electromagnetic coil 344, bearings 346, a flux insert 348, a spacer 352, a supply bore 354, bearings 358 and a mounting plate 370. It should be noted that a return bore in the housing 336 is not shown in FIG. 7 for simplicity, but can be provided in a manner similar to that show and described with respect to the preceding embodiments. The clutch 330 can function in a similar manner to that described with respect to the embodiments of clutches 30, 130 and 230. However, in the embodiment of FIG. 7, the reservoir 338 is attached to a front side of the rotor disk 334, opposite the electromagnetic coil 344. The valve assembly 342 can be attached to the mounting plate 370 that in turn is mounted to the shaft 332 separate from the rotor disk 334. In that way the valve assembly 342 is located at a rear side of the rotor disk 334. The non-magnetic bearing spacer 352 can be provided between the mounting plate 370 and the bearing 346 that supports the housing 336. The mounting plate 370 can be made of magnetic flux conductive material. A flux path of the clutch 330 can be provided as follows: from the electromagnetic coil 344 to the flux insert 348 to the armature 342-1 (and optionally the valve arm 342-2) to the mounting plate 370 to the drive shaft 332 and back to the electromagnetic coil 344.

Figure 8:
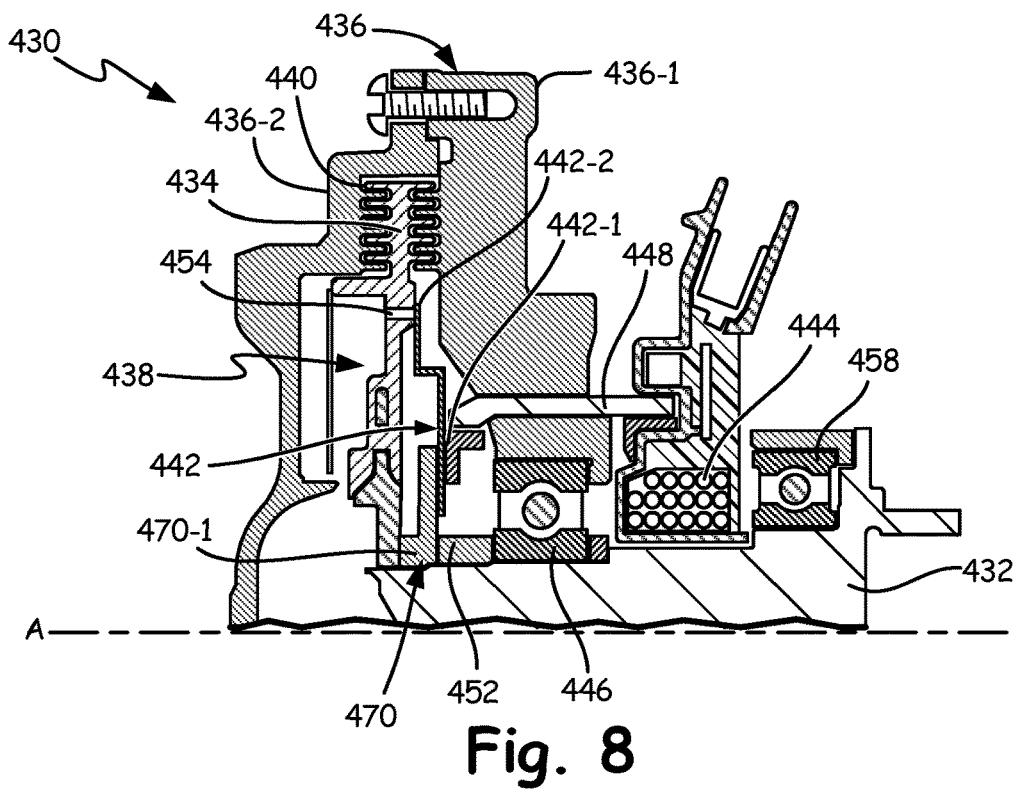
FIG. 8 is a partial cross-sectional view of another embodiment of a viscous clutch according to the present invention.

FIG. 8 is a partial cross-sectional view of another embodiment of a viscous clutch 430. The clutch 430 is similar in many respects to the embodiments of clutches 30, 130, 230 and 330 described above, and therefore reference characters used in FIG. 8 are similar to those used with respect to the embodiments shown in FIGS. 1-7 but with values incremented by one hundred above those in FIG. 7. As shown in FIG. 8, the clutch 430 includes a drive shaft 432, a rotor disk 434, a housing 436 (with a base 436-1 and a cover 436-2), a reservoir 438, a working chamber 440, a valve assembly 442 (with an armature 442-1 and a valve arm 442-2), an electromagnetic coil 444, bearings 446, a flux insert 448, a spacer 452, a supply bore 454, bearings 458 and a mounting plate 470. It should be noted that a return bore in the housing 436 is not shown in FIG. 8 for simplicity, but can be provided in a manner similar to that show and described with respect to the preceding embodiments. The clutch 430 can function in a similar manner to that described with respect to the embodiments of clutches 30, 130, 230 and 330. However, the clutch 430 has a different configuration of the mounting plate 470 that spaces the valve arm 442-2 further from the rotor disk 434, and the reservoir 438 is attached to a front side of the rotor disk 434, opposite the electromagnetic coil 444. An integrated spacer portion 470-1 is provided with the mounting plate 470 as shown in FIG. 8. In alternative embodiments, a separate piece (not shown) can be provided between the mounting plate 470 and the rotor disk 434, such as a spacer (e.g., similar to spacer 50 described above with respect to another embodiment) that can magnetically isolate the mounting plate 470 from the rotor disk 434.

Figure 9:
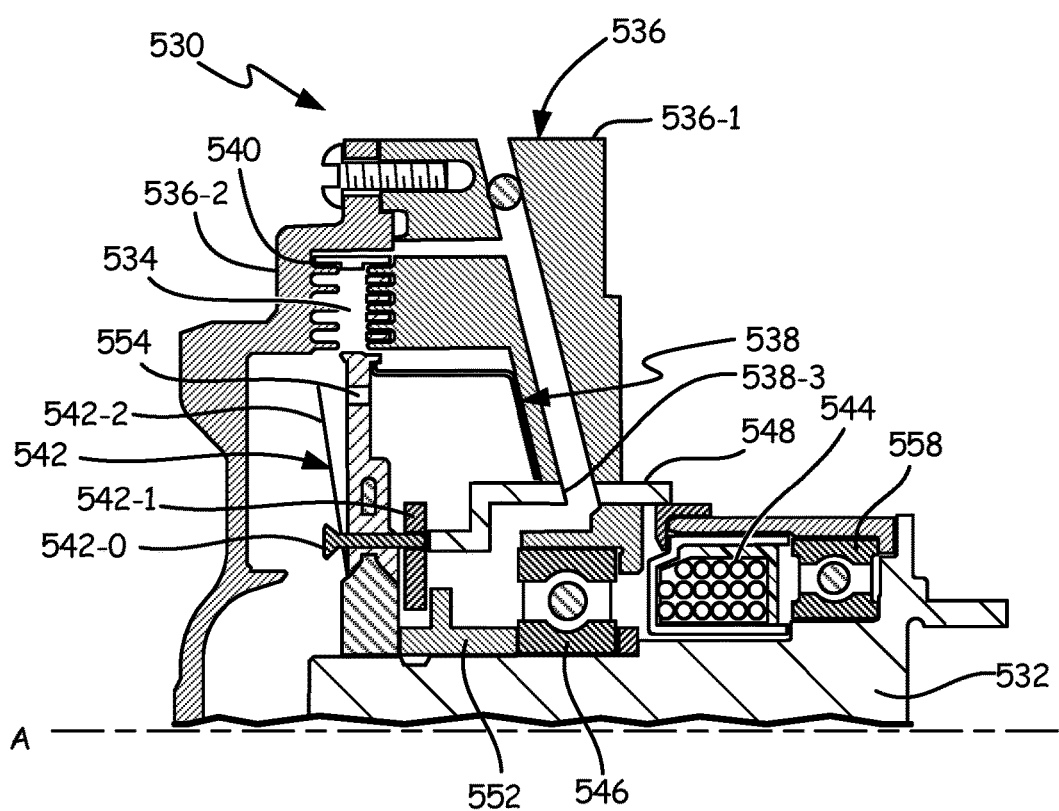
FIG. 9 is a partial cross-sectional view of yet another embodiment of a viscous clutch according to the present invention.

FIG. 9 is a partial cross-sectional view of yet another embodiment of a viscous clutch 530. The clutch 530 is similar in many respects to the embodiments of clutches 30, 130, 230, 330 and 430 described above, and therefore reference characters used in FIG. 9 are similar to those used with respect to the embodiments shown in FIGS. 1-8 but with values incremented by one hundred above those in FIG. 8. As shown in FIG. 9, the clutch 530 includes a drive shaft 532, a rotor disk 534, a housing 536 (with a base 536-1 and a cover 536-2), a reservoir 538, a working chamber 540, a valve assembly 542 (with a control pin 542-0, an armature 542-1 and a valve arm 542-2), an electromagnetic coil 544, bearings 546, a flux insert 548, a spacer 552, a supply bore 554, a return bore 556 and bearings 558. The clutch 530 can function in a similar manner to that described with respect to the embodiments of clutches 30, 130, 230, 330 and 430. However, in the embodiment of the clutch 530 shown in FIG. 9, the reservoir 538 is attached to a rear side of the rotor disk 534. Furthermore, the valve assembly 542 can have a difference configuration, similar in some respects to the valve configuration disclosed in commonly-assigned PCT Application No. PCT/US13/60889. The armature 542-1 can be located at a rear side of the rotor disk 534 and the valve arm 542-2 can be located at a front side of the rotor disk 534, with one or more control pins 542-0 extending through rotor disk 534 to connect the armature 542-1 and the valve arm 542-2. The valve arm 542-2 can be affixed to the rotor disk 534 and the control pin 542-0 engaged with the valve arm 542-2 at a location spaced from a fulcrum or pivot point of the valve arm 542-2. In further embodiments, an additional spacer (not shown) can be provided between the spacer 552 and the bearing 546 that supports the housing 536, such as an additional spacer (e.g., similar to spacer 50 described above with respect to another embodiment) that can magnetically isolate the spacer 552 from the bearing 546. A flux path of the clutch 530 can be provided as follows: from the electromagnetic coil 544 to the flux insert 548 to the armature 542-1 (and optionally the control pin 542-0 and/or the valve arm 542-2) to the spacer 552 to the drive shaft 532 and back to the electromagnetic coil 544.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

Although the present invention has been described with reference to preferred embodiments, workers skilled in the art will recognize that changes may be made in form and detail without departing from the spirit and scope of the invention. For example, the disclosed clutch embodiments could be operated with torque inputs and outputs reversed. Moreover, spacers used within embodiments of the clutch can be either magnetically flux conductive or non-magnetically flux conductive, as desired for particular applications. Additionally, features described or shown with respect to one embodiment can be incorporated into nearly any other embodiment as desired.

The invention claimed is:

1. A viscous clutch comprising:
a shaft;
a rotor attached to the shaft;
a housing located adjacent to the rotor;
a working chamber defined between the rotor and the housing;
a reservoir used to store a shear fluid, wherein selective introduction of the shear fluid to the working chamber facilitates selective torque transmission between the rotor and the housing;
a valve assembly, wherein the valve assembly regulates flow of the shear fluid between the reservoir and the working chamber, the valve assembly including an armature;
an electromagnetic coil, wherein selective energization of the electromagnetic coil governs actuation of the valve assembly, and wherein the valve assembly is positioned axially in between the rotor and the electromagnetic coil; and
a flux insert in the housing,
wherein a flux circuit is provided that extends from the electromagnetic coil to the armature and back to the electromagnetic coil, wherein the flux circuit passes through the flux insert and through the shaft, and wherein the flux circuit crosses a radial air gap between the flux insert and the armature.

2. The viscous clutch of claim 1 and further comprising:
a spacer positioned on the shaft in between the rotor and a first bearing that rotationally supports the electromagnetic coil.

3. The viscous clutch of claim 2, wherein the spacer abuts a second bearing supporting the housing.

4. The viscous clutch of claim 3, wherein the second bearing supports the housing on the shaft.

5. The viscous clutch of claim 2, wherein the spacer is made of a non-magnetic material and is located inside a middle of the flux circuit.

6. The viscous clutch of claim 1, wherein the flux insert has a first end and an opposite second end, and wherein the first and second ends are radially offset from one another.

7. The viscous clutch of claim 6, wherein the first end of the flux insert is located adjacent to the electromagnetic coil, wherein the second end of the flux insert is located adjacent to the armature, and wherein the first end is located radially outward of the second end.

8. The viscous clutch of claim 6, wherein the second end of the flux insert is located radially outward of the armature.

9. The viscous clutch of claim 1, where the flux insert is located radially outward of the armature.

10. The viscous clutch of claim 1, wherein the flux circuit crosses a radial air gap between the flux insert and the electromagnetic coil.

11. The viscous clutch of claim 1, wherein the rotor includes an inner diameter insert.

12. The viscous clutch of claim 1, wherein the flux circuit crosses a radial air gap between the electromagnetic coil and the shaft.

13. The viscous clutch of claim 1 and further comprising:
a mounting plate, wherein the flux circuit passes axially from the armature to the mounting plate and radially to the shaft through the mounting plate.

14. The viscous clutch of claim 1, wherein the flux circuit passes axially forward of the armature, away from the electromagnetic coil, along a portion of the flux circuit that extends between the armature and the shaft.

15. The viscous clutch of claim 1, the valve assembly further comprising:
a valve arm actuatable by the armature, wherein the armature is located axially in between the valve arm and the electromagnetic coil.

16. The viscous clutch of claim 1, the valve assembly further comprising:
a valve arm actuatable by the armature, wherein the valve arm is located axially in between the armature and the rotor, and wherein the armature is axially spaced from the rotor.

17. The viscous clutch of claim 1, the valve assembly further comprising:
   a valve arm actuatable by the armature, wherein the valve arm is located axially in between the rotor and the flux insert.

18. The viscous clutch of claim 1, wherein the reservoir is carried by the rotor, and wherein the reservoir is located on an opposite side of the rotor from the valve assembly.

* * * * *

UNITED STATES PATENT AND TRADEMARK OFFICE
CERTIFICATE OF CORRECTION

PATENT NO. : 10,385,932 B2  
APPLICATION NO. : 15/591576  
DATED : August 20, 2019  
INVENTOR(S) : Raimund Krammer, Derek Savela and Bastian Brand It is certified that error appears in the above-identified patent and that said Letters Patent is hereby corrected as shown below:

On the Title Page

Page 2, Column 2, Line 29 In the referenced cited, under foreign patent documents:
Please insert --WO WO2007/016494 A1 2/2007--

Signed and Sealed this
Fifth Day of May, 2020

Andrei Iancu
*Director of the United States Patent and Trademark Office*